CIRCUIT FOR NEUTRALIZATION OF FREQUENCY DIVIDER CHAINS

Filed Jan. 5, 1946

INVENTOR
JOHN K. PHELAN

BY

M. A. Hayes

ATTORNEY

Patented Jan. 15, 1952

2,582,603

UNITED STATES PATENT OFFICE 2,582,603

CIRCUIT FOR NEUTRALIZATION OF FREQUENCY DIVIDER CHAINS

John K. Phelan, Medford, Mass., assignor, by mesne assignments, to the United States of America as represented by the Secretary of the Navy Application January 5, 1946, Serial No. 639,281

3 Claims. (Cl. 250—36)

This invention relates to frequency dividers, and more particularly to such dividers employing series connected frequency-dividing blocking oscillators.

Systems of series connected blocking oscillators have been developed for use in frequency division. Whenever blocking oscillators are connected in series for such a purpose there will be interaction between stages unless a means is employed where one oscillator will not fire until its preceding one has cut off. Such a system would cause a phase error in the output. To obtain phase accuracy, oscillators must be connected so they all fire simultaneously. When this is done some means must be provided to neutralize adjacent stages to prevent errors in the operation of blocking oscillators connected in such a manner. A few methods have been proposed for such purposes involving different types of coupling and neutralization. One such method requires the use of extra tubes, and another is subject to phase errors.

It is an object of my invention to provide an accurate frequency divider chain with means of preventing interaction between blocking oscillator stages utilizing an additional coupling or feedback between the outputs of adjacent stages.

Another object of my invention is to provide such a feedback or neutralization means using few extra components.

Figure 1:
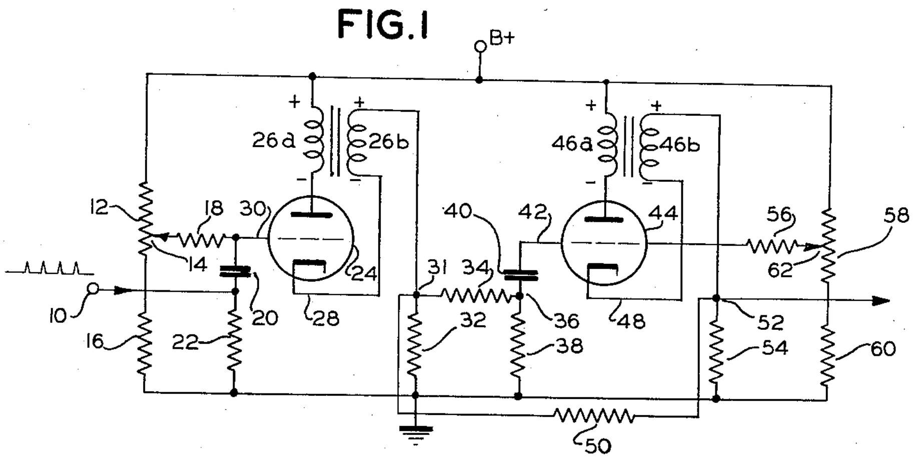
Figure 2:
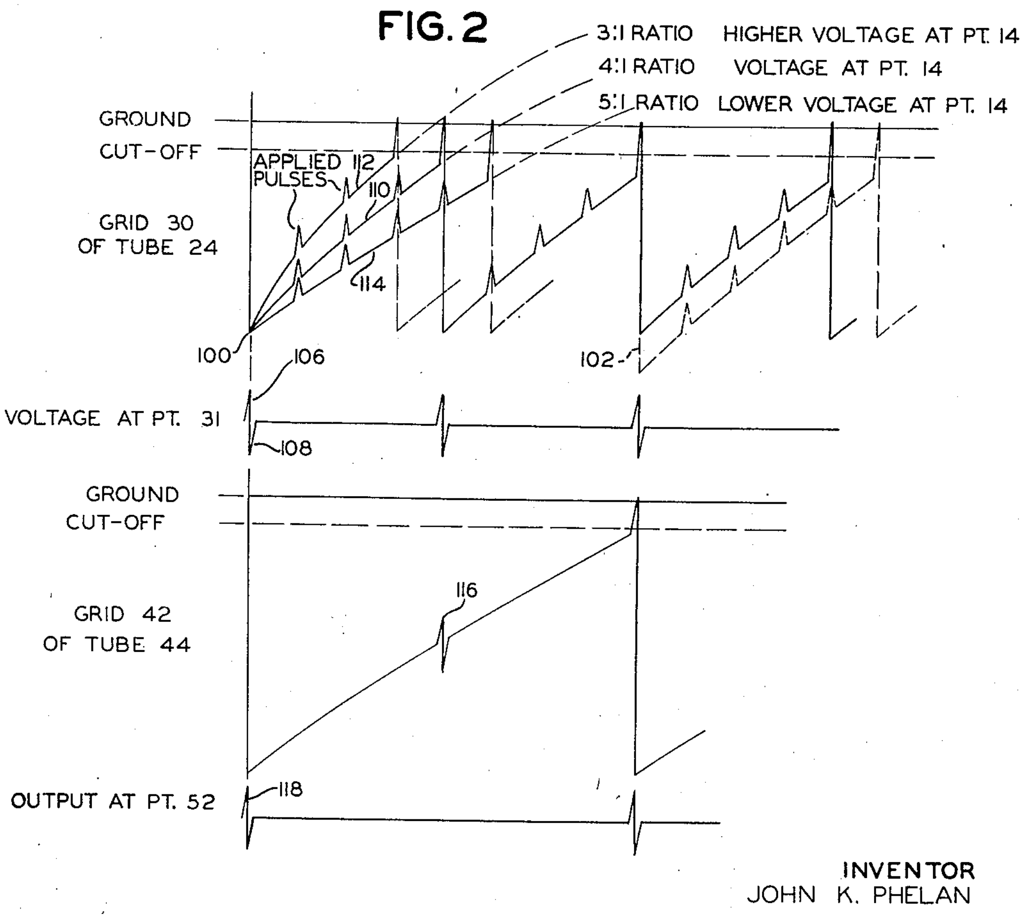

To accomplish the foregoing general objects, and more specific objects which hereinafter appear, my invention resides in the circuit elements and their relation one to another, as are more particularly described in the following specification. The specification is accompanied by drawings, in which:

Fig. 1 is a diagram showing a chain of blocking oscillators using features of my invention; and, Fig. 2 shows the waveforms in, and is explanatory of, the circuit shown in Fig. 1.

One example of my invention is shown in Fig. 1. This circuit comprises two blocking oscillators 24 and 44. Each blocking oscillator connects from B+ through one winding of a transformer to the plate of a tube and from the tube cathode through the opposite winding of the transformer to ground. RC biasing circuits are provided to control each tube grid. The grid of each tube in unison with the applied pulses, controls the dividing ratio of each blocking oscillator.

The first blocking oscillator receives a certain number of pulses before it will fire. The output from this blocking oscillator is fed to the following blocking oscillator which also will receive a certain number of pulses before firing. Thus, each blocking oscillator is a factor in the dividing ratio.

When the second blocking oscillator conducts, it will feed back a signal to the cathode of the preceding blocking oscillator, which will cause the grid of that stage to go more negative than normal, the drop may be as shown by the dotted line at 102 in Fig. 2. Such a large drop would change the counting ratio, as indicated, for it will be noted that it is a fifth pip instead of a fourth that crosses the cut-off and causes the tube to conduct.

My invention eliminates this undesirable action by means of a resistance coupling from the second or later stage to the preceding stage, and so insures the maintenance of the desired ratio of frequency division.

Although the drawing shows only two blocking oscillators in the circuit, any number may be connected in the same way, by using the feedback coupling shown between each section.

The operation of the circuit is as follows. For purposes of explanation it will be assumed that the first stage employs a 4:1 division ratio, and the second a 2:1 division ratio. It should be remembered, however, that other ratios may be used in actual practice.

The blocking oscillator tube 24 has its grid 30 tied through resistor 18 to a relatively high positive voltage at tap 14 on a voltage divider made up of resistors 12 and 16. Grid 30 starts to go positive, causing tube 24 to conduct, and the increase in plate current through the transformer winding 26*a* induces a voltage in the winding 26*b*. The polarity of the transformer is such that the cathode 28 of tube 24 is driven negative, effectively giving the tube more positive bias, which causes the tube to conduct more and to drive the cathode more negative. During this time, grid current from the grid 30 to the cathode 28 discharges the capacitor 20 driving it negative as shown at 100 in Fig. 2. This continues until the voltage at grid 20 is equal to or less than that of the cathode 28.

The grid capacitor 20 now starts to charge back exponentially toward the voltage at tap 14, through resistor 18. The higher the voltage at tap 14, the faster the capacitor 20 will charge, which will give a lower counting ratio, and conversely, the lower the voltage at tap 14, the greater the counting ratio. Tap 14 is set for the proper ratio, and is not changed after calibration.

In Fig. 2, the curve 110 corresponds to a ratio of 4:1, and curve 112 corresponds to a ratio of 3:1, while the curve 114 corresponds to a ratio of 5:1. When tube 24 (Fig. 1) conducts (with the fourth pulse in the case of curve 110) the output at point 31 (Fig. 1) goes positive and then negative as shown at 106 and 108 (Fig. 2). The wave form at point 31 (Fig. 1) will be stepped down by the voltage divider composed of resistors 34 and 38, so that the same wave but with reduced amplitude will appear at point 36. This waveform will be coupled through capacitor 40 to the grid 42 of the tube 44. Tube 44 will operate in the same manner as tube 24, obtaining its bias at tap 62 on the resistance divider 58 and 60. Just after it conducts, its grid will be very negative and will start charging and rising toward cut-off. Each pulse coming in from the first stage whenever it triggers will be added to the grid voltage at grid 42 as a spike, as shown at 116 in Fig. 2. With each second pulse from tube 24, tube 44 will conduct at the same time as tube 24 conducts. Each time tube 44 conducts, point 52 will go positive and then negative. The negative pips occur because of the action of the blocking oscillator, but will not harm the output. The output 118 in Fig. 2 is taken off at point 52.

When tube 44 conducts, its grid goes negative, which causes points 36 and 31 to go negative also. When point 31 goes negative, it will cause the cathode 28 of tube 24 to drop also, and thus increase the flow of grid current in the tube, so that the grid 30 of tube 24 goes even more negative than normally, as is indicated at 102, Fig. 2. As was already explained, this could change the counting ratio of the first stage, and thus the accuracy of the whole system.

My invention neutralizes the effect of the negative feedback at point 30 to maintain the accuracy of the system. As point 31 is driven negative by the grid 42 of tube 44 when it conducts, point 52 goes positive. This positive waveform at point 52 is fed back through resistor 50 to point 31. Resistor 50 is proportioned with resistor 32 so that a portion of this positive waveform, enough to overcome the negative effect from grid 42, is applied at point 31. This offsets the effect of tube 44 when it conducts, and effectively neutralizes the blocking oscillators.

The arrangement shown has the advantage that the neutralization is accomplished at a point before reaching the preceding tube, hence there is less chance of jitter being introduced as is the case when the feedback is introduced in the tube itself. Thus in the present case, feedback is applied at point 31 instead of to a lead of tube 24. In addition, since both stages operate simultaneously there will not be an error in the phase or time relation of the output pulses and input pulses.

Since the first stage in this case was 4:1 and the second stage was 2:1, the output will be a chain of pips with ⅛th the repetition rate of the applied pulses. It will be understood that these dividing ratios are merely an example, since most any rate can be made by varying the size of resistors 18 and 56 and the size of condensers 20 and 40 in the grids of the two tubes.

It is believed that the construction and operation as well as the advantages of my improved frequency divider circuit will be apparent from the foregoing detailed description thereof. It will also be apparent that while I have shown and described my invention in a preferred form, changes may be made in the circuits disclosed without departing from the spirit of the invention as sought to be defined in the following claims.

What is claimed is:

1. A frequency dividing circuit comprising a plurality of synchronized blocking oscillators connected in series, each of said oscillators including an electron tube having at least a grid and a cathode, an output circuit associated with said cathode and a frequency controlling circuit associated with said grid; said series connection comprising, resistive coupling means coupling the output circuit of each oscillator in said series to the frequency controlling circuit of the following oscillator of said series and second resistive coupling means coupling the end of each of said first resistive coupling means associated with said output circuit to the output circuit of the following oscillator in said series whereby the effect of each oscillator in said series on the preceding oscillator in said series is minimized and means for applying a synchronizing signal to the frequency controlling circuit of the first oscillator in said series.

2. A frequency dividing circuit comprising a plurality of synchronized blocking oscillators connected in series, each of said oscillators comprising an electron tube having at least a grid, a cathode and an anode, a transformer, said transformer having a primary winding connected from said anode to a source of anode potential and a secondary winding having one terminal thereof connected to said cathode and a second terminal thereof connected to a point of reference potential through a first resistor, a capacitor having one terminal thereof connected to said grid and a second terminal thereof connected to said point of reference potential through a second resistor, and a third resistor coupling said grid to a source of bias potential, said series connection comprising a first coupling resistor coupling said second terminal of said secondary winding in each of said oscillators to said second terminal of said capacitor in the following oscillator in said series, and a second coupling resistor coupling said second terminal of said secondary winding in each of said oscillators to said second terminal of said secondary winding of the preceding oscillator in said series whereby the effect of each of said oscillators on the preceding oscillator in said series is minimized and means for coupling a signal to said second terminal of said capacitor in the first oscillator in said series.

3. A frequency dividing circuit comprising a plurality of synchronized blocking oscillators connected in series, each of said oscillators comprising an electron tube having at least a grid, a cathode and an anode, a transformer having a primary winding connected from said anode to a source of anode potential and a secondary winding having one terminal thereof connected to a point of reference potential through a first resistor, said transformer being poled to cause said cathode to rise in potential in response to a fall in potential on said anode, a capacitor having one terminal thereof connected to said grid and a second terminal thereof connected to said point of reference potential through a second resistor, a voltage divider coupled between said point of reference potential and a source of positive potential, and a third resistor coupling said grid to an intermediate point on said voltage divider, said capacitor, said voltage divider and said second and third resistors forming the timing circuit for said blocking oscillator, said series connection comprising a first coupling resistor coupling said second terminal of said secondary winding in each of said oscillators to said second terminal of said capacitor in the following oscillator in said series, and a second coupling resistor coupling said second terminal of said secondary winding in each of said oscillators to said second terminal of said secondary winding of the preceding oscillator in said series, said second coupling resistor being so proportioned with respect to said first resistor in the preceding oscillator that the signals coupled thereacross from said first resistor and said grid, respectively, of the following oscillator are substantially equal whereby the effect of each oscillator on the preceding oscillator is neutralized at a point ahead of the electron tube in said preceding oscillator and means for coupling a signal to said second terminal of said capacitor in the first oscillator in said series.

JOHN K. PHELAN.

REFERENCES CITED

The following references are of record in the file of this patent:

UNITED STATES PATENTS

| Number | Name | Date |
|---|---|---|
| 2,171,536 | Bingley | Sept. 5, 1939 |
| 2,212,202 | Faudell | Aug. 20, 1940 |
| 2,254,087 | Percival | Aug. 26, 1941 |
| 2,451,859 | Mumma et al. | Oct. 19, 1948 |
| 2,493,517 | Applegarth, Jr. | Jan. 3, 1950 |

OTHER REFERENCES

Butler, "Cathode-Coupled Oscillators," Wireless Engineer, November 1944, p. 521–6.